April 13, 1965  A. G. ISENBERG  3,177,849
PLASTIC BIRD HOUSE
Filed March 5, 1962  3 Sheets-Sheet 1

Albert Guy Isenberg
INVENTOR.

BY R. Frank Smith
Harold N. Powell
ATTORNEYS

April 13, 1965 A. G. ISENBERG 3,177,849
PLASTIC BIRD HOUSE
Filed March 5, 1962 3 Sheets-Sheet 2

Albert Guy Isenberg
INVENTOR.

April 13, 1965    A. G. ISENBERG    3,177,849
PLASTIC BIRD HOUSE

Filed March 5, 1962    3 Sheets-Sheet 3

Albert Guy Isenberg
INVENTOR.

BY R. Frank Smith
Harold M. Powell
ATTORNEYS 3,177,849
PLASTIC BIRD HOUSE
Albert Guy Isenberg, Kingsport, Tenn., assignor to Eastman Kodak Company, Rochester, N.Y., a corporation of New Jersey
Filed Mar. 5, 1962, Ser. No. 177,626
2 Claims. (Cl. 119—23)

This invention relates to a serviceable low cost bird house. More particularly this invention concerns an economical, serviceable housing structure especially appealing for purple martins, wrens and the like birds which nest in man-made structures.

As well known there are a number of wild bird fanciers, particularly persons interested in the species of birds known as martins. Such people may spend considerable effort and money for martin houses. The currently used structures are generally comprised of wood. Such structures are meritorious in many respects and any effort on the part of people to thus foster wild life is regarded with admiration. However, such martin houses may be relatively expensive. This is thought to be the situation even if the structures are made from kits (knock downs) or the like as illustrated by the disclosure in U.S. Patent 2,915,040. In any event prior art structures may be quite large and heavy thereby requiring a heavy support for withstanding wind and weather. Therefore, there can be periodic problems in taking down such structures for cleaning, painting and repair.

In order to obviate some of the disadvantage rising out of the use of wood structures it has been proposed, as illustrated by U.S. Patent 2,887,987 to use ceramic materials. Here again while such types of construction are meritorious in a number of respects, such structures may be relatively heavy, subject to cracking or breakage if dropped, blown down and otherwise encounter shock. Some general mention has been made in the art to utilizing plastics in the manufacture of structures of the class indicated but teachings have not been furnished as to plastics which are useful and operative.

Because of problems of the aforementioned type it appears that there may be a considerable number of people who would like to provide housing for birds or otherwise foster such wild life but who may be deterred from doing so because of the time and expense involved. Hence it is believed apparent that the development of a relatively simple low cost yet highly serviceable housing structure for wild birds represents a desirable result.

After substantial investigation and experimental work on a practical scale, I have found a simplified wild bird housing structure and materials for the manufacture thereof, as set forth in detail hereinafter, which novel structure eliminates or minimizes a number of the problems heretofore encountered.

This invention has for one object a housing structure for wild birds such as martins, wrens and the like which is simple of manufacture, relatively low cost and serviceable. A particular object of this invention is to provide a bird house structure of the class indicated which is especially resistant to weathering, thereby being relatively free of maintenance. Still another object is to provide information concerning materials and methods for the manufacture of structures of the class indicated. A still further object is to disclose a variety of configurations which may be used for bird housing structures in employing the particular materials described in detail herein. Other objects will appear hereinafter.

In the broader aspects of my invention I have found that certain plastics materials, usually available commercially, may be simply and readily formed into bird house structures. The plastic structures as described in detail hereinafter (although not all plastics) are not only accepted by the wild birds and are quite suitable, but such structures after a reasonable period of tests have been found to withstand weathering, wind and the like outside atmospheric conditions to a satisfactory extent.

My tests of the novel structures of the present invention have included among other things the following: Structures manufactured in accordance with the present disclosure were mounted in the same area or vicinity with other usually used bird houses. This included some rather elaborate wooden martin houses as well as along with (grown) gourds. The latter, namely the gourds, being bird shelters of about a year's weathering duration. The use of gourds was apparently initiated by the American Indian for fostering wild bird life in the vicinity of their camps. Such was apparently quite effective in building up martin colonies and thereby cutting down on insect annoyance such as mosquitoes. Such natural gourds while useful in providing temporary housing for wild life presents practical problems in obtaining. It requires a growing season to produce such gourds before they can be used which must be repeated because as mentioned above the life of a gourd is usually around a year before patching or other repairs are needed. It is well known, for example, that an adult martin consumes in a 12-hr. period on the order of thousands of insects, hence improving the area frequented by such wild birds. The comparative set-ups of the structures of the present invention with heretofore used structures were carried out in different areas as far as about 100 miles apart.

As will be apparent from the examples set forth hereinafter the plastic structures of the instant invention were not only operable but competed favorably with heretofore used structures for housing such wild birds. In some instances the birds nested in the opaque and colored structures of the present invention apparently preferable to more elaborate and expensive structures. My tests indicated however, that such birds do not nest in transparent or translucent plastic structures particularly if other housing was available.

In further detail and in further description the broader features of the present invention I have found that plastic materials chemically known as mixed esters of cellulose, exemplified by cellulose acetate butyrate, and polyolefin plastics exemplified by polyethylene and particularly polypropylene provide useful materials for fabricating the structures of the present invention. Also styrenes and modified styrenes such as acrylonitrile-styrene and acrylonitrile-butadiene-styrene may be used. Such plastics may be obtained in sheet form. These sheets may be fabricated into the desired simple structures of the present invention by vacuum forming. Or the plastic may be obtained in the form of molding pellets and/or granules and may be fabricated by blow molding or other known procedures. The materials aforementioned which are useful for the present invention may be readily colored black or bright colors or rendered opaque by the incorporation of pigments. The plastics would have incorporated therein various additives including ultraviolet stabilizers and the like. As already indicated above I prefer to employ dark colored or opaque materials since transparent or translucent materials do not appear to provide an acceptable structure. I have found that the plastics as just described are especially useful because with suitable formulations as will be referred to hereinafter, structures made therefrom will withstand outdoor exposure very well and hence require little upkeep.

For assistance in a further understanding of the present invention reference is made to the attached drawings forming a part of this application.

Figure 1:
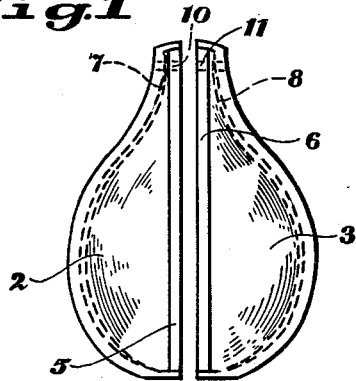
FIG. 1 is a diagrammatic side elevation view of a simple house structure (partly opened) in accordance with the present invention.
Figure 2:
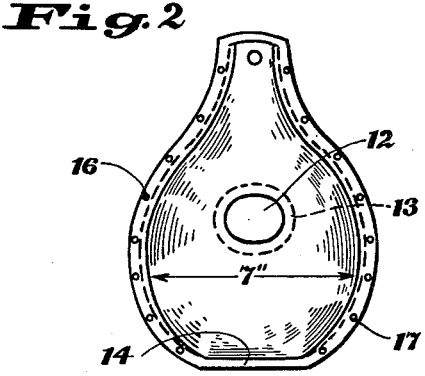
FIG. 2 is a side view of one of the elements of FIG. 1 positioned so as to note the interior.
Figure 3:
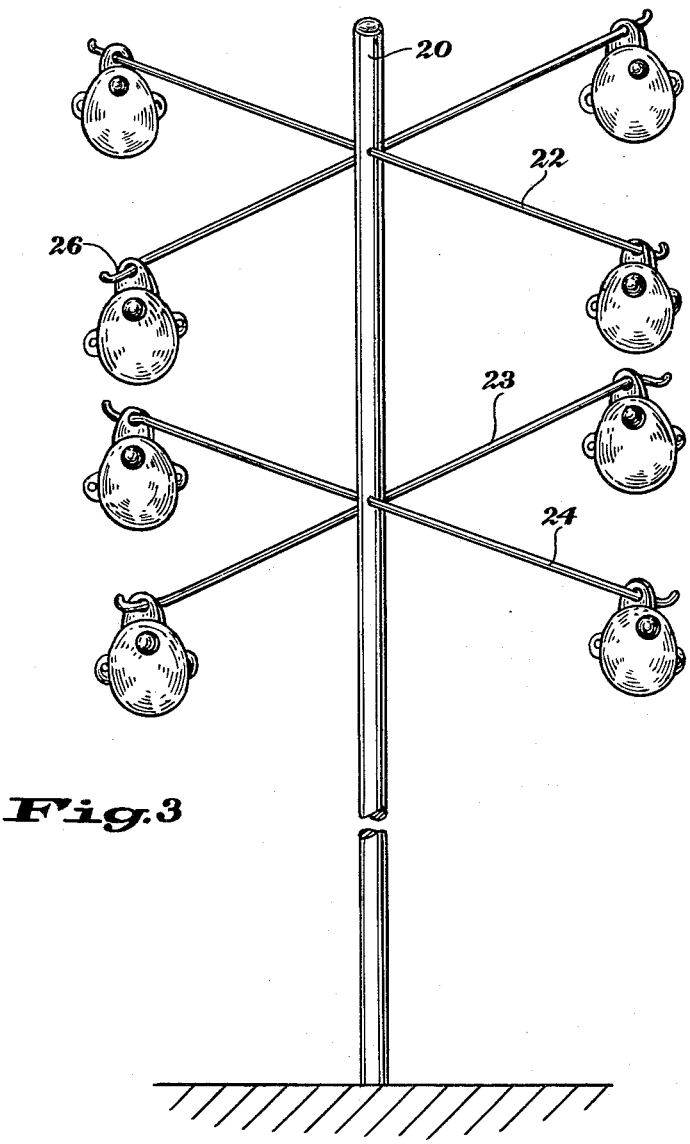
FIG. 3 is a general perspective illustration indicating how a number of the simple structures of the present invention may be mounted.

Referring to FIGS. 1, 2 and 3 represent sections which (when placed together) would form a tear-drop, spherical, or punching-bag shaped bird house structure of the one species of this invention. These sections 2 and 3 may be readily prepared by vacuum forming. Flanged or beaded edges 5 and 6 or the like are provided so that when the two sections are positioned together they may be held in place by wire clips, bolts (not shown) or the like simple fastening means. In the instance of preparing these structures from polypropylene, due to the flexibility thereof it is possible to have one section hinged to the other section by a polypropylene hinge since such material may be flexed many times without danger of breakage. The upper portion of the structure at 7 and 8 is provided with flanges, nubs or ear portions having openings therethrough 10, 11. Such openings provide a simple way for supporting the structures on the pole side arms or for fastening thereto as will be apparent from the discussion of FIG. 3.

Referring to FIG. 2 which shows the inner portion of a section from FIG. 1, a suitable opening 12 will be provided in one of these sections so that the bird may gain access to the interior of the structure. For versatility such opening may be molded in the form of a punch-out in the plastic as indicated at 13. A smaller punch-out would result as at 12. For wrens the punch-out would be only about 1 inch in diameter. For purple martins the punch-out would be about 2½ inches. As is known such openings desirably are controlled to reasonably close approximation of the aforementioned dimensions, otherwise if there is too much variation the birds are not likely to inhabit an otherwise satisfactory structure. The overall width may be about 7 inches as indicated in FIG. 2 although this dimension need not be so accurately controlled. For wrens a smaller dimension as 4 inches would be satisfactory. The bottom of the structure preferably would have a rounded or flattened area as generally designated at 14. Fastening means are diagrammatically depicted at 16, 17, etc.

If desired, relatively small weep holes may be provided in the bottom in the vicinity of 14 for drainage. Likewise a protrusion or bending out of the punch-out for a perch (not shown) may be included. However, since such type of refinements are not fundamental to the present invention, an extended discussion of such details is unnecessary. As a matter of fact martins, where there is a reasonably correct size opening in the structure will fly full speed into the opening without the need of any outside landing perch or platform.

Reference is now made to FIG. 3 wherein there is shown a manner of mounting a plurality of plastic bird housing structures of the present invention. A supporting pole of wood, aluminum or the like is provided at 20. Such structure does not need to be of heavy construction because the bird houses of the present invention not only do not exert a large amount of weight but their tear-drop shape cuts down wind resistance. Such multiple housing structures as illustrated in FIG. 3 is preferably positioned in the open even though exposed to wind and weather inasmuch as purple martins apparently prefer an unobstructed approach to their housing. As many side arms 22 and 23 and 24 as desired may be provided for holding a plurality of the structures. The ends of such side arms may have a forked or similar type construction diagrammatic indicated at 26 such that the flange or nub of the housing structure may be inserted therein and pinned. Or the flange with the hole therethrough may be pushed over the rod side arm, bolted thereto or otherwise fastened. The present construction due to its simplicity and relative lightness of weight permits of a wide variety of simple ways of attaching such structures to the side arm support. By employing various colored structures (other than transparent) interesting effects upon landscape decoration may be obtained. As pointed out above by tests, it has been shown that martins will inhabit the housing structures herein described of all colors.

Figure 4:
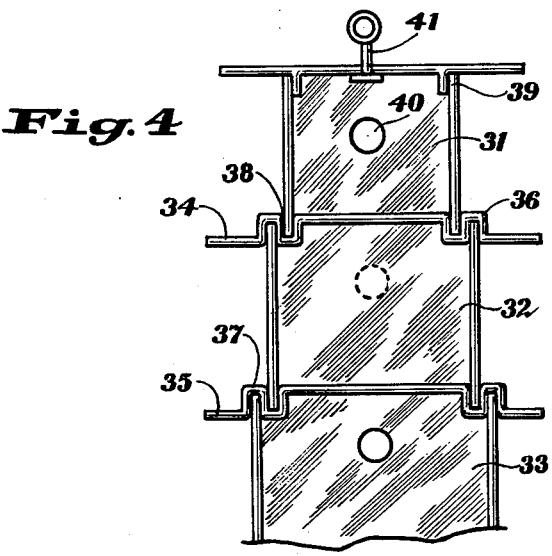
FIG. 4 is a front view in which certain of the parts have been shown in an exaggerated or exploded relationship, for clarity, of another embodiment of structure.

Referring now to FIG. 4, this shows a species of structure such as might be made from a series of plastic tubes, 31, 32 and 33 of the above compositions. Vacuum formed partitions or dividers are provided at 34 and 35. The joints as at 36 and 37 have been shown in a somewhat exaggerated manner and would be fitted closer in practical manufacture so the parts may be cemented or otherwise held in place, as by cement injected as at 38 and 39. Since the plastic has a substantial amount of flexibility, the parts may be readily assembled even if the tolerances are small. Suitable openings and supporting means are provided at 40 and 41.

Figure 5:
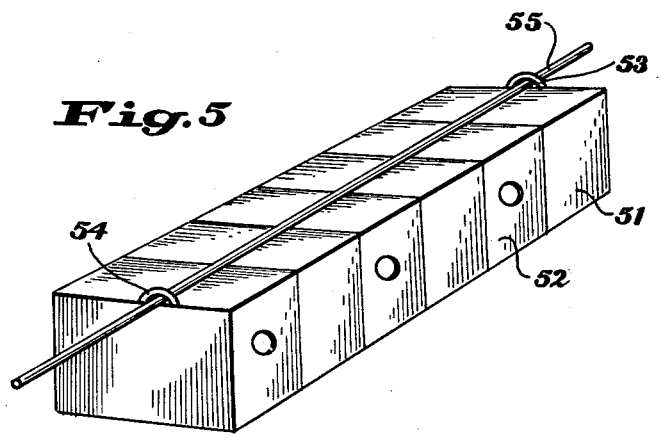
FIG. 5 is a perspective view of another embodiment of house structure.

Referring to FIG. 5, this shows a structure from a series of blow molded boxes which may be readily cemented together for obtaining as many units as desired. Supporting rings 53 and 54 are provided to receive the supporting rod 55.

For a further understanding of my invention and for illustrating certain preferred embodiments the following examples are set forth.

*Example I*

In accordance with this example the tear-drop shaped bird house or structure was made from two sections as described in connection with FIGS. 1 and 2. These sections were made by taking a .100" gauge of colored acetate butyrate, polypropylene, or polyethylene and vacuum forming it in a standard manner to the desired shape and then assembling.

The composition of the polyethylene plastic was primarily polyethylene of a molecular weight within the range of 5,000 to 100,000 number average containing small amounts of the components antioxidants, ultra-violet inhibitors, stabilizers, coloring agents, and pigments.

Several colored structures were manufactured as aforesaid of (1) a structure which was black inside and white outside; (2) structure brown throughout; (3) a structure black throughout and (4) a translucent structure. Tests over several months indicated that purple martins readily inhabited structures 1, 2 and 3 in competition with standard wooden martin houses and adjacent types of other structures. Such other types of structures appeared to be preferred to the translucent structure of No. 4. After a number of months under normal weathering conditions examination of the plastic houses failed to show any indication of deterioration in the structure even though periods had elapsed where wood material, gourds and the like were evidencing signs of weather and wear. This was the situation even though the cost of the structures of the instant example were only of the order of ⅕ to ⅟₁₀ the cost of some of the competing structures.

Structures similar to the aforementioned 1, 2 and 3 were fabricated in a generally similar manner from plastic sheets comprised of .100" gauge cellulose acetate butyrate which contained in its composition small amounts of ingredients such as ultra-violet inhibitors, stabilizers and coloring agents and pigments. Highly serviceable and weatherable houses were obtained.

*Example II*

In accordance with this example the species of structure shown in FIGURE 4 was prepared from acetate butyrate tubes or cylinders with vacuum formed spacers. Such tubes are fairly readily available and relatively economical. The parts may be cemented together by any of the conventional plastic cements available around fabricating shops. The resultant structure exhibited good serviceability and weatherability properties.

*Example III*

In accordance with this example the rectangular structure of FIGURE 5 was fabricated by cementing together heavy gauge sheets or sections of styrene plastic (as referred to above) into the configuration shown. Although the resulting structure was reasonably serviceable, it was not regarded as satisfactory as the preferred constructions of Examples I and II.

While I prefer housing structures generally of the above described tear-drop or punching bag configuration other simple shapes may be prepared in an economical manner as indicated. For example, for wrens, smaller and box-like plastic structures may be fabricated, or other structures may be made in accordance with my invention as suggested in FIGURES 4 and 5, for example.

It is apparent from the foregoing, due to the longer life of the plastic structure of the present invention, the relative freedom from maintenance as well as the initial low cost that a greater number of the public will be able to participate in providing housing for wild birds thereby benefiting the country. Such benefit is not only from the aesthetic standpoint but as indicated above in view of martins' activities against insects, areas where there are substantial martin colonies are noticeably freer of such objectionable insects.

Although the invention has been described in considerable detail with particular reference to certain preferred embodiments thereof, variations and modifications can be effected within the spirit and scope of the invention as described hereinabove, and as defined in the appended claims.

I claim:
1. As a new article of manufacture a housing structure for wild birds, said structure consisting essentially of a wind and weather resistant, substantially fully enclosed nesting portion, a member attached thereto and protruding therefrom adapted to facilitate the attachment of the nesting portion to a support for the entire structure, said nesting portion being characterized in that it is non transparent, contains a punched out opening to admit the wild birds to the nesting portion and said substantially fully enclosed nesting portion being constructed of a weather resistant plastic of a gage of the order of .10″ from the group consisting of mixed organic acid esters of cellulose, polyolefins and styrenes, which plastics contain at least one stabilizer and one ultraviolet inhibitor.

2. The article of claim 1 wherein the structure is of a teardrop configuration and made at least substantially entirely of weather resistant polypropylene which contains at least one stabilizer and at least one ultra-violet inhibitor.

References Cited by the Examiner

UNITED STATES PATENTS

| | | | |
|---|---|---|---|
| 1,916,878 | 7/33 | Anklam | 119—23 |
| 2,260,018 | 10/41 | Garthus | 119—23 |
| 2,887,987 | 5/59 | Fitzgerald et al. | 119—23 |
| 2,839,418 | 6/59 | Meyer | 106—182 |
| 2,914,436 | 11/59 | Nakielny | 106—181 X |
| 2,956,896 | 10/60 | Kibler | 106—181 |
| 3,087,460 | 4/63 | Stone | 119—23 |

SAMUEL KOREN, *Primary Examiner.*

CARL W. ROBINSON, HUGH R. CHAMBLEE,
*Examiners.*